(12) United States Patent
Catoe

(10) Patent No.: US 11,000,914 B2
(45) Date of Patent: May 11, 2021

(54) PLIERS FOR CLEANING A NOZZLE OF A WELDING GUN

(71) Applicant: Brandon Lee Catoe, Kershaw, SC (US)

(72) Inventor: Brandon Lee Catoe, Kershaw, SC (US)

( * ) Notice: Subject to any disclaimer, the term of this patent is extended or adjusted under 35 U.S.C. 154(b) by 101 days.

(21) Appl. No.: 16/244,045

(22) Filed: Jan. 9, 2019

(65) Prior Publication Data

US 2019/0210142 A1 Jul. 11, 2019

Related U.S. Application Data

(60) Provisional application No. 62/615,405, filed on Jan. 9, 2018.

(51) Int. Cl.
*B23K 9/32* (2006.01)
*B25B 7/02* (2006.01)
*B25B 7/08* (2006.01)
*B08B 9/043* (2006.01)
*B23K 9/29* (2006.01)
*B25B 7/22* (2006.01)

(52) U.S. Cl.
CPC ............ *B23K 9/328* (2013.01); *B08B 9/0436* (2013.01); *B23K 9/293* (2013.01); *B23K 9/295* (2013.01); *B25B 7/02* (2013.01); *B25B 7/08* (2013.01); *B25B 7/22* (2013.01)

(58) Field of Classification Search
None
See application file for complete search history.

(56) References Cited

U.S. PATENT DOCUMENTS

| | | | |
|---|---|---|---|
| 6,257,105 B1* | 7/2001 | Lin | B25B 27/205 29/229 |
| 10,376,982 B2* | 8/2019 | Mizutani | B25B 7/22 |
| 2008/0264216 A1* | 10/2008 | Duffy | B25B 7/18 81/302 |

* cited by examiner

*Primary Examiner* — Brian D Keller
(74) *Attorney, Agent, or Firm* — Jeffrey C. Watson; Mathew L. Grell; Grell & Watson Patent Attorneys LLC

(57) ABSTRACT

Pliers for cleaning a welding gun nozzle include a right and left handle. The right handle is configured to operate a top left gripping end and a bottom right nozzle cleaner. The left handle is configured to operate a top right gripping end and a bottom left nozzle cleaner. The right handle are hingedly fixed together about a connection point. When the left handle and the right handle are closed, the top left gripping end and the top right gripping end are configured to squeeze together and the bottom right nozzle cleaner and the bottom left nozzle cleaner are configured to spread apart. And, when the left handle and the right handle are opened, the top left gripping end and the top right gripping end are configured to spread apart and the bottom right nozzle cleaner and the bottom left nozzle cleaner are configured to come together.

17 Claims, 14 Drawing Sheets

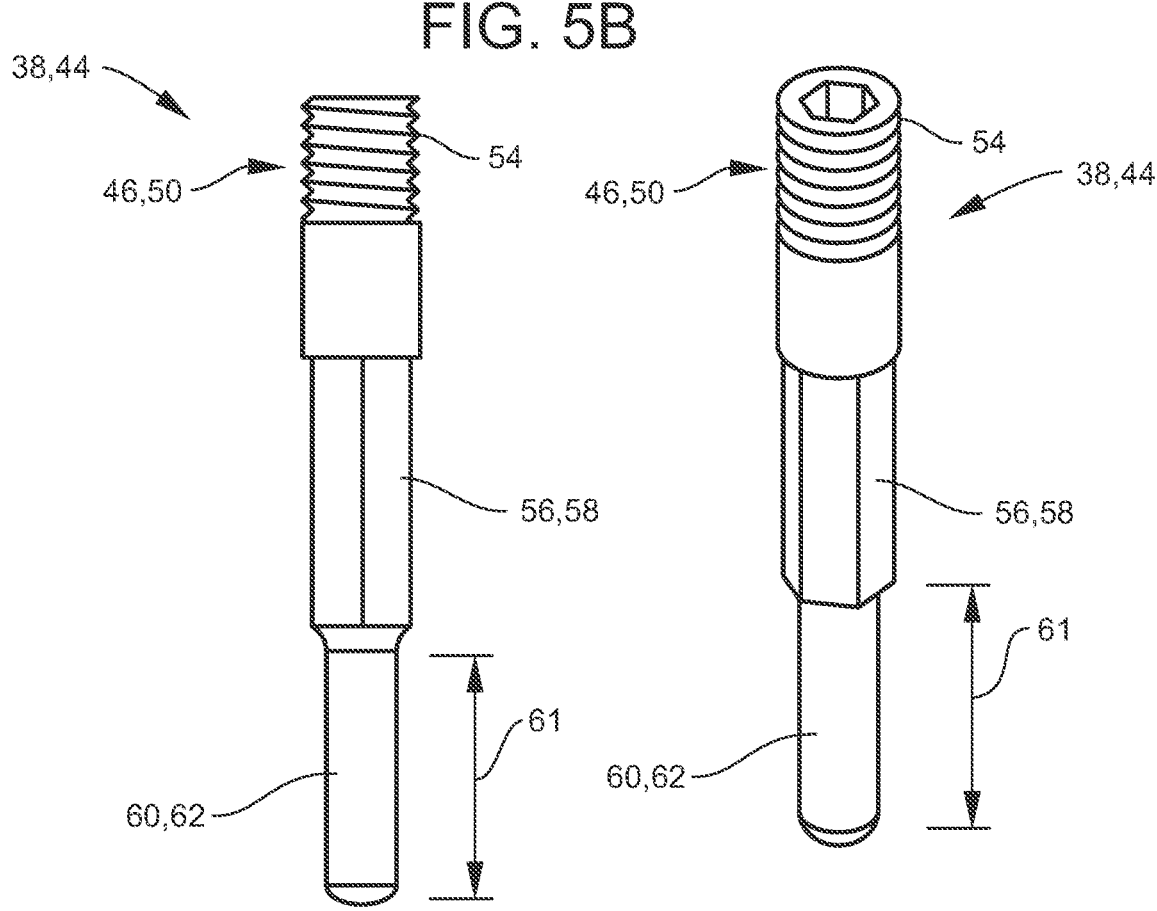

PLIERS FOR CLEANING A NOZZLE OF A WELDING GUN

CROSS-REFERENCE TO RELATED APPLICATIONS

This application claims benefit of priority application, U.S. Provisional Ser. No. 62/615,405 filed Jan. 9, 2018 entitled "Pliers for Cleaning a Nozzle of a Welding Gun", which is incorporated herein by reference in its entirety.

FIELD OF THE DISCLOSURE

The present disclosure is directed to pliers. More specifically, the present disclosure is directed toward pliers for cleaning a nozzle of a welding gun, like for cleaning, removing, installing and handling the nozzle of a gas metal arc welding gun (GMAW) or a metal insert gas (MIG) welding gun, or a metal active gas (MGA) welding gun, or generally a welding gun nozzle.

BACKGROUND

Generally speaking, gas metal arc welding (GMAW), sometimes referred to by its subtypes metal inert gas (MIG) welding or metal active gas (MAG) welding, is a welding process in which an electric arc forms between a consumable wire electrode and the workpiece metal or metals, which heats the workpiece metals, causing them to melt and join. Along with the wire electrode, a shielding gas feeds through the welding gun, which shields the process from contaminants in the air. Originally developed in the 1940s for welding aluminum and other non-ferrous materials, GMAW was soon applied to steels because it provided faster welding time compared to other welding processes. The cost of inert gas limited its use in steels until several years later, when the use of semi-inert gases such as carbon dioxide became common. Further developments during the 1950s and 1960s gave the process more versatility and as a result, it became a highly used industrial process. Today, GMAW is the most common industrial welding process, preferred for its versatility, speed and the relative ease of adapting the process to robotic automation.

The typical GMAW welding gun has a number of key parts: a control switch, a contact tip, a power cable, a gas nozzle, an electrode conduit and liner, and a gas hose. The control switch, or trigger, when pressed by the operator, initiates the wire feed, electric power, and the shielding gas flow, causing an electric arc to be struck. The contact tip is connected to the welding power source through the power cable and transmits the electrical energy to the electrode while directing it to the weld area. It must be firmly secured and properly sized, since it must allow the electrode to pass while maintaining electrical contact. On the way to the contact tip, the wire is protected and guided by the electrode conduit and liner, which help prevent buckling and maintain an uninterrupted wire feed. The gas nozzle directs the shielding gas evenly into the welding zone. Inconsistent flow may not adequately protect the weld area. Larger nozzles provide greater shielding gas flow, which is useful for high current welding operations that develop a larger molten weld pool.

There are several shapes and sizes of welding nozzles available, including straight, bottleneck and short or long taper nozzles. Straight nozzles typically have larger inside diameters, but don't offer as good of joint access. If greater joint access is critical, a bottleneck nozzle may be the better option. These nozzles are particularly good for automated welding applications. Short and long taper nozzles are also common choices for gaining good joint access. Note, that long taper nozzles typically have a smaller inside diameters and may collect spatter more readily. When possible, using a short taper nozzle can help prevent such a problem. When selecting a nozzle, it is important to find one that provides the best joint access for the application. It is also imperative that the nozzle allows for the proper gas flow to the weld puddle in order to keep contaminants away. As such, the best choice may be to use as large of a nozzle as possible that still allows access to the weld joint. Doing so helps ensure the greatest shielding gas flow. Larger nozzles are also less prone to collecting spatter compared to those with smaller inside diameters. However, the instant disclosure recognizes that even with properly sized and shaped welding nozzle, spatter still occurs and builds up in the welding nozzle and tip.

Welding gun nozzles play a critical role in the welding operation. Having a clean properly sized nozzle for the job can help reduce weld defects, rework and associated downtime, while also extending consumable life. In any welding application, the cleanliness of the nozzle, can have a significant impact on the quality, productivity and overall cost of the welding operation. Storing and handling nozzles properly can also help improve their overall performance. In addition, the amount of time and effort it takes to clean a nozzle effects the associated downtime of the welding operation. All of these factors impact the bottom line. Unfortunately, like other welding consumables, the importance of selecting the right nozzle and keeping the selected nozzle clean is often overlooked.

Currently, welders use various combinations of standard pliers, files and screw drivers for handling and cleaning welding nozzles. However, the instant disclosure recognizes the need for a tool that helps with cleaning the nozzle, including, handling and replacing the welding nozzles.

The instant disclosure is designed to address at least certain aspects of the problems or needs discussed above by providing pliers for cleaning a nozzle of a welding gun.

SUMMARY

Accordingly, in one aspect, the present disclosure embraces pliers for cleaning a welding gun nozzle. The pliers for cleaning a welding gun nozzle may generally include a right handle and a left handle. The right handle may be configured to operate a top left gripping end of a top pliers portion and a bottom right nozzle cleaner of a bottom nozzle cleaner mechanism. The left handle may be configured to operate a top right gripping end of the top pliers portion and a bottom left nozzle cleaner of the bottom nozzle cleaner mechanism. The right handle and the left handle may be hingedly fixed together about a connection point, wherein when the left handle and the right handle are closed together, the top left gripping end and the top right gripping end may be configured to squeeze together as the top pliers portion, and the bottom right nozzle cleaner and the bottom left nozzle cleaner may be configured to spread apart as the bottom nozzle cleaner mechanism. And, when the left handle and the right handle are opened from one another, the top left gripping end and the top right gripping end may be configured to spread apart as the top pliers portion, and the bottom right nozzle cleaner and the bottom left nozzle cleaner may be configured to come together as the bottom nozzle cleaner mechanism.

One feature of the disclosed pliers for cleaning a welding gun nozzle may be that they can be configured for cleaning the welding gun nozzle via the bottom nozzle cleaner mechanism with the bottom right nozzle cleaner and the bottom left nozzle cleaner. In select embodiments, when the left handle and the right handle are closed together, the bottom right nozzle cleaner and the bottom left nozzle cleaner are configured to spread apart, which can be used for, but is clearly not limited to, cleaning an inside wall of an outer casing of the welding gun nozzle. In other select embodiments, when the left handle and the right handle are opened from one another, the bottom right nozzle cleaner and the bottom left nozzle cleaner are configured to come together, which can be used for, but is clearly not limited to, cleaning an outside of a tip of the welding gun nozzle.

Another feature of the disclosed pliers for cleaning a welding gun nozzle may be that the bottom left nozzle cleaner may include a left pin oriented perpendicular from a bottom surface of the pliers, and the bottom right nozzle cleaner may include a right pin oriented perpendicular from the bottom surface of the pliers. In select embodiments, the left pin may include a first threaded portion for removably attaching the left pin to a first threaded hole in the bottom left nozzle cleaner, and the right pin may include a second threaded portion for removably attaching the right pin to a second threaded hole in the bottom right nozzle cleaner. In select embodiments, the first threaded portion of the left pin and the second threaded portion of the right pin may be left-handed threads configured to be inserted into the first threaded hole and the second threaded hole, respectively, via counter clockwise rotation to prevent backing out of the left pin and the right pin. In other select embodiments, the left pin may include a hexagonal-shaped bottom left portion configured for being gripped for inserting and removing the left pin, and the right pin may include a hexagonal-shaped bottom right portion configured for being gripped for inserting and removing the right pin.

Another feature of the disclosed pliers for cleaning a welding gun nozzle may be that the left pin may include a cylindrical top left portion with a length or size configured for cleaning the welding gun nozzle, and the right pin may include a cylindrical top right portion with the length or size configured for cleaning the welding gun nozzle.

In select embodiments of the disclosed pliers for cleaning a welding gun nozzle, the pliers may include a top tab plate. The top tab plate may be positioned over the left handle and the right handle at the connection point. The top tab plate may be configured to join together the left handle and the right handle. The top tab plate may include the top left gripping end. The right handle may include a notch cut out for receiving a protrusion from the top tab plate. Wherein, when the right handle is rotated about the connection point, the top tab plate may rotate the top left gripping end. In select embodiments, the left handle with the top right gripping end may be comprised of one solid piece. In other select embodiments, a steel pin may be positioned through the top tab plate, the right handle and the left handle at the connection point. Wherein, the steel pin may be configured to attach the left handle, the right handle and the top tab plate.

In select embodiments of the disclosed pliers for cleaning a welding gun nozzle, the top left gripping end may be a left needle nose pliers end. Likewise, the top right gripping end may be a right needle nose pliers end. Wherein, the top left gripping end and the top right gripping end may be operable as needle nose pliers via the left handle and the right handle.

Another feature of the disclosed pliers for cleaning a welding gun nozzle may be that the pliers can be configured as multi-function pliers for welders. These multi-functional pliers may be configured to have the convenience of needle nose pliers via the top left gripping end and the top right gripping end, and a wire snipper via the left handle and the right handle, while adding the ability to clean the welding gun nozzle without damaging it via the bottom right nozzle cleaner and the bottom left nozzle cleaner. In addition, the pliers may include a nozzle remover configured for removing the welding gun nozzle and the tip from a welding gun.

In select embodiments of the disclosed pliers for cleaning the welding gun nozzle, a wire snipper may be between the left handle and the right handle. Wherein, the left handle and the right handle may include corresponding indentions configured for cutting wire between the left handle and the right handle.

In select embodiments of the disclosed pliers for cleaning the welding gun nozzle, a nozzle remover may be included as an opening portion configured for gripping the welding gun nozzle between the left handle and the right handle. Wherein, the left handle and the right handle may include corresponding concave sections configured for nozzle removal and installation In another aspect, the instant disclosure embraces pliers for cleaning a welding gun nozzle that can include a pair of bottom nozzle cleaners extending perpendicular from the pliers. The pair of bottom nozzle cleaners may be configured to spread apart when the pliers are closed. The pair of bottom nozzle cleaners may also be configured to come together when the pliers are opened. Wherein, the pair of bottom nozzle cleaners may be operable as a nozzle cleaner mechanism configured for cleaning the welding gun nozzle.

In select embodiments of the disclosed pliers for cleaning a welding gun nozzle, a pair of top gripping ends may be on the top of the pair of bottom nozzle cleaners. The pair of top gripping ends may be configured to squeeze together when the pliers are closed. The pair of top gripping ends may be configured to spread apart when the pliers are opened. Wherein, the pair of top gripping ends are operable as a pliers portion.

In select embodiments of the disclosed pliers for cleaning a welding gun nozzle, the pair of top gripping ends may be a pair of needle nose pliers ends. Wherein, the pair of top gripping ends may be operable as needle nose pliers.

In another aspect, the instant disclosure embraces a method of cleaning a welding gun nozzle. The disclosed method of cleaning a welding gun nozzle may include using the disclosed pliers for cleaning a welding gun nozzle in any of the various embodiments shown and/or described herein. As such, the disclosed method of cleaning a welding gun nozzle may generally include the steps of: providing the disclosed pliers for cleaning a welding gun nozzle in any of the various embodiments shown and/or described herein; and cleaning the welding gun nozzle with the pair of bottom nozzle cleaners of the provided pliers.

In select embodiments of the disclosed method of cleaning a welding gun nozzle, the step of cleaning the welding gun nozzle with said pair of bottom nozzle cleaners of the provided pliers may include: cleaning an inside wall of an outer casing of the welding gun nozzle via closing the pliers where said pair of bottom nozzle cleaners spread apart against the outer casing of the welding gun nozzle; cleaning an outside of a tip of the welding gun nozzle via opening the pliers where said pair of bottom nozzle cleaners come together against the outside of the tip of the welding gun nozzle; or a combination thereof.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 5A illustrates a perspective view of one of the threaded pin devices of the pliers shown in FIG. 1;

FIG. 5B illustrates a top view of the threaded pin device of FIG. 5A;

FIG. 5C illustrates a side view of the threaded pin device of FIG. 5A

FIG. 5D illustrates a bottom view of the threaded pin device of FIG. 5A

Figure 1:
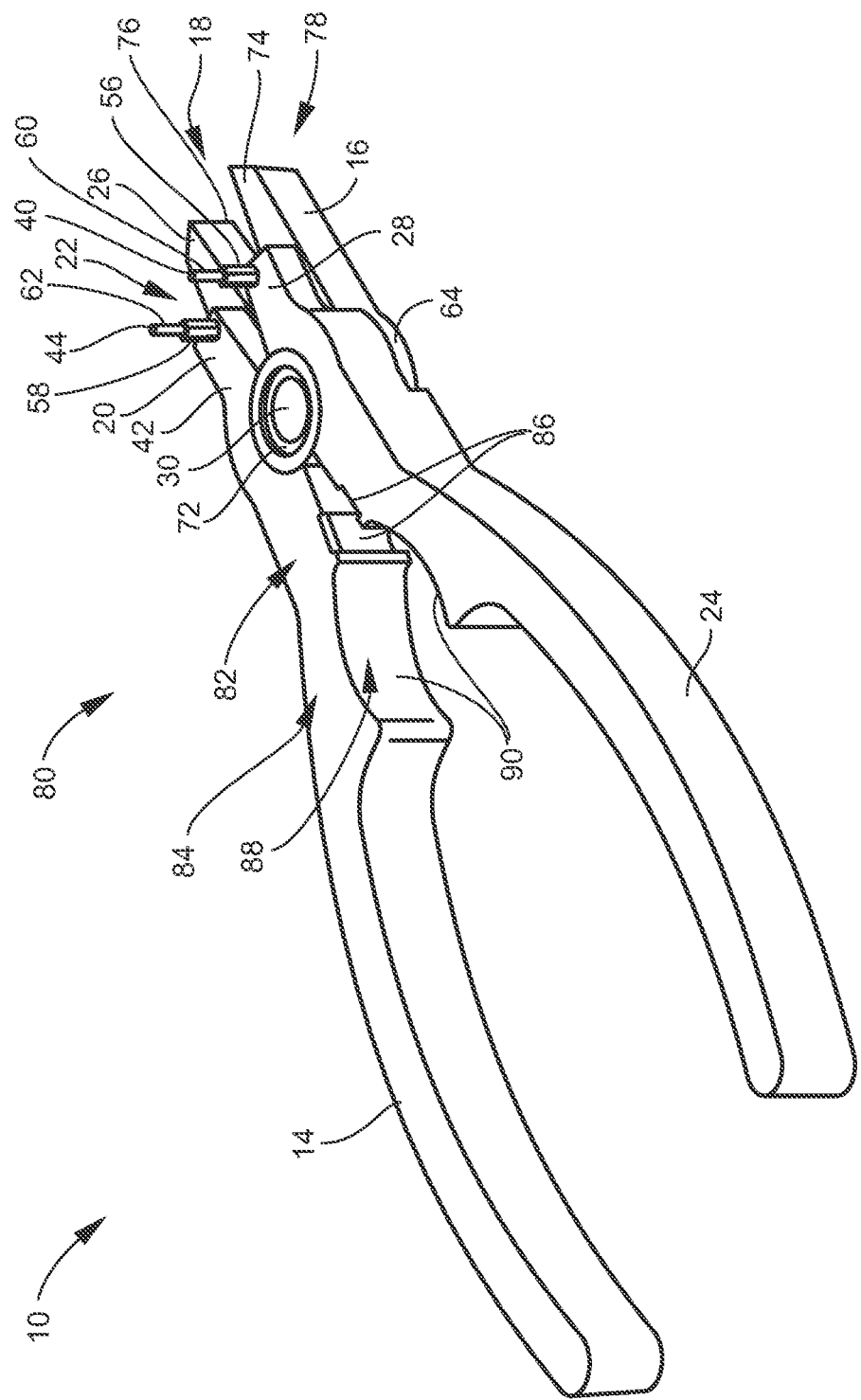
FIG. 1 illustrates a perspective view of the pliers for cleaning a nozzle of a welding gun according to select embodiments of the instant disclosure.
Figure 2A:
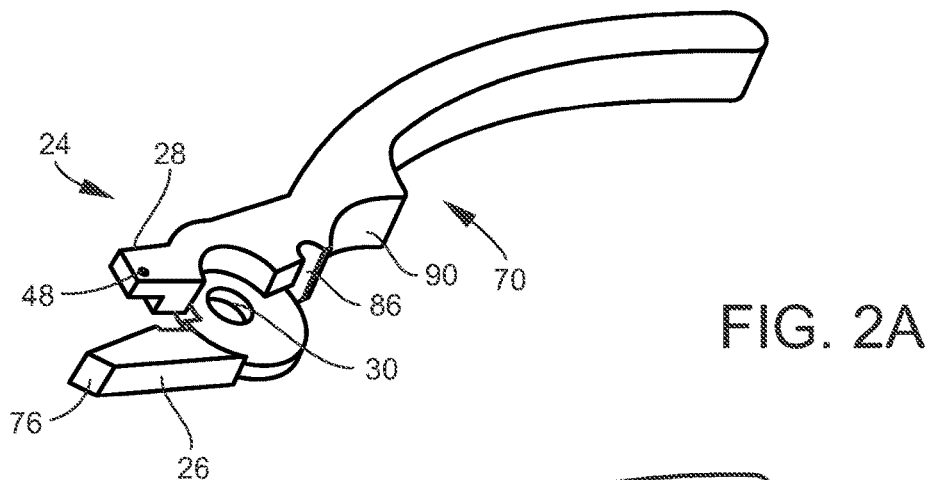
FIG. 2A illustrates a perspective view of the left handle device of the pliers shown in FIG. 1.
Figure 2B:
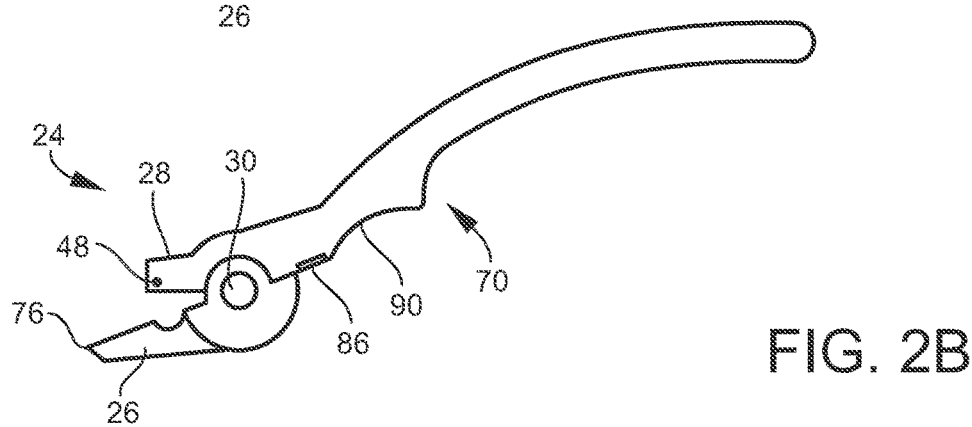
FIG. 2B illustrates a top view of the left handle device of FIG. 2A.
Figure 2C:
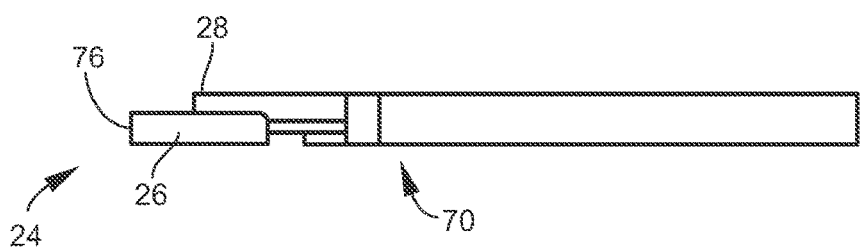
FIG. 2C illustrates a side view of the left handle device of FIG. 2A
Figure 2D:
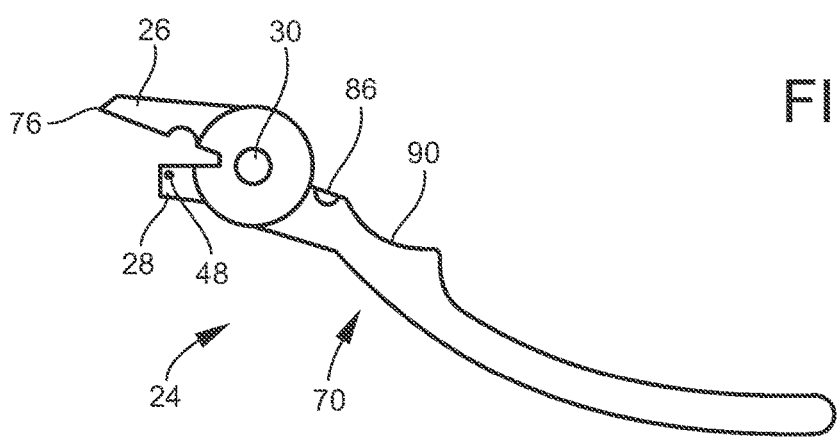
FIG. 2D illustrates a bottom view of the left handle device of FIG. 2A
Figure 3A:
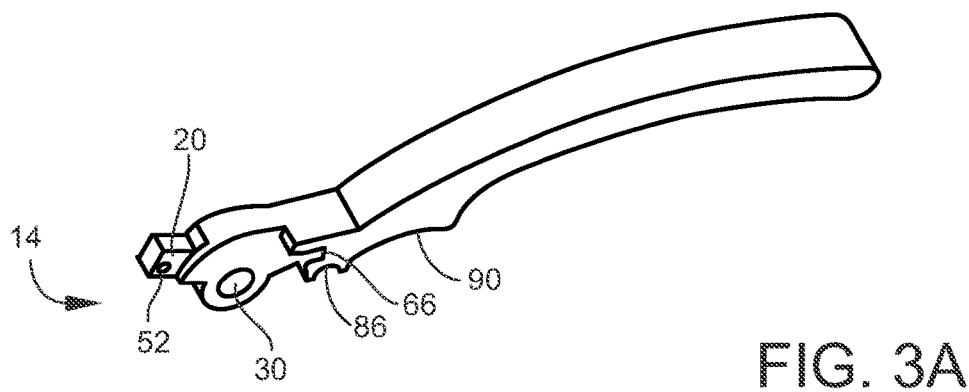
FIG. 3A illustrates a perspective view of the right handle device of the pliers shown in FIG. 1.
Figure 3B:
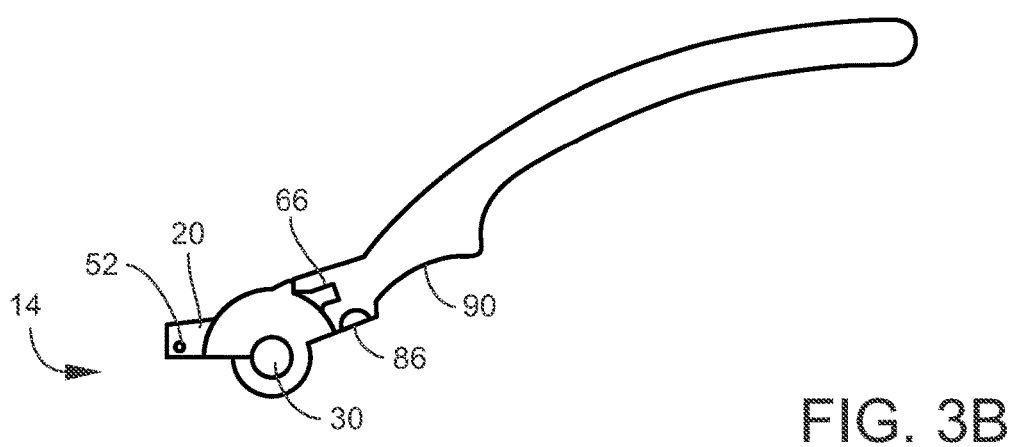
FIG. 3B illustrates a top view of the right handle device of FIG. 3A.
Figure 3C:
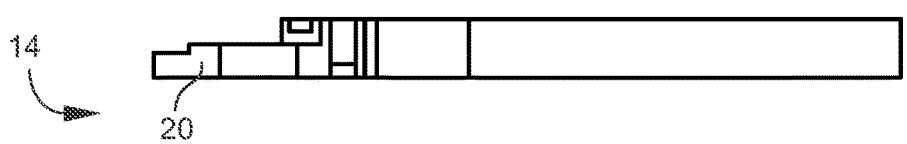
FIG. 3C illustrates a side view of the right handle device of FIG. 3A
Figure 3D:
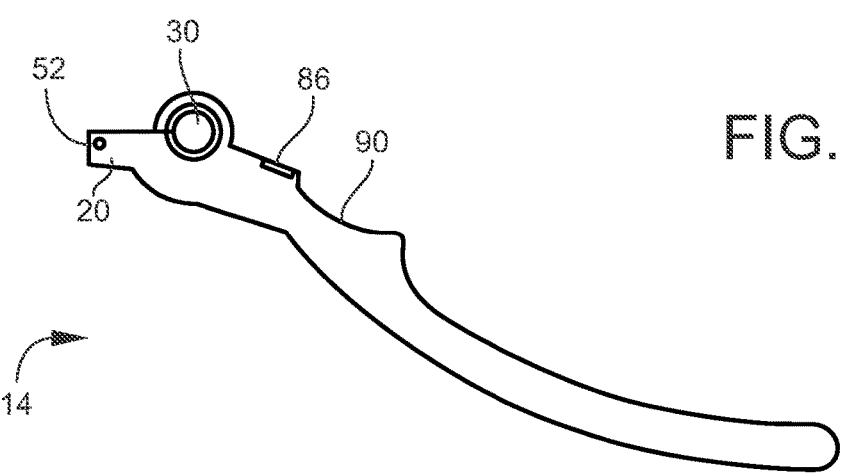
FIG. 3D illustrates a bottom view of the right handle device of FIG. 3A
Figure 4A:
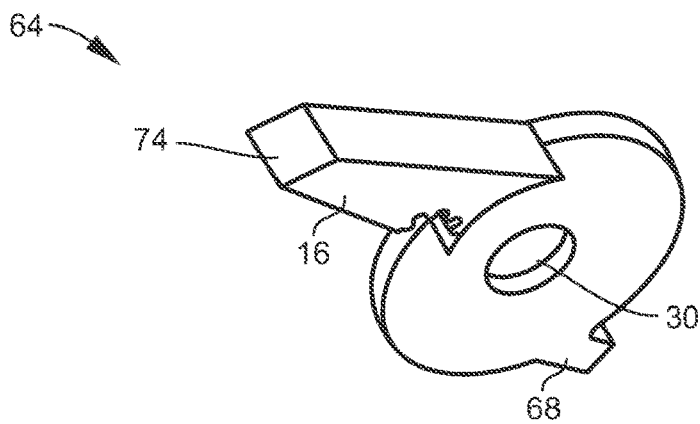
FIG. 4A illustrates a perspective view of the top tab plate device of the pliers shown in FIG. 1.
Figure 4B:
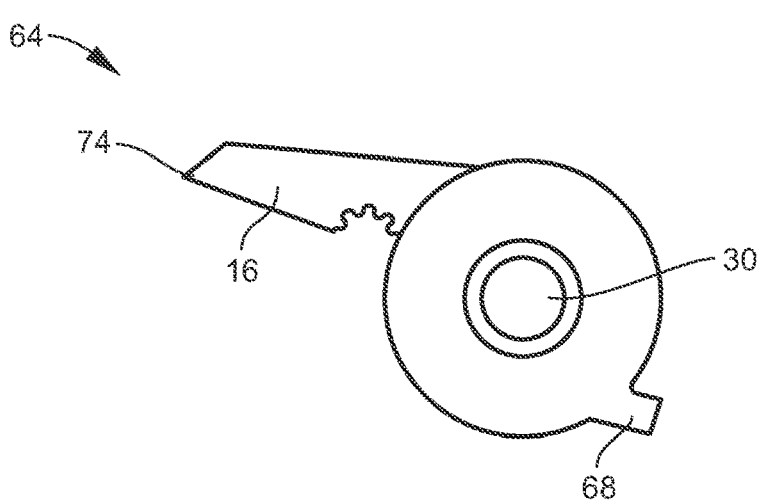
FIG. 4B illustrates a top view of the top tab plate device of FIG. 4A.
Figure 4C:
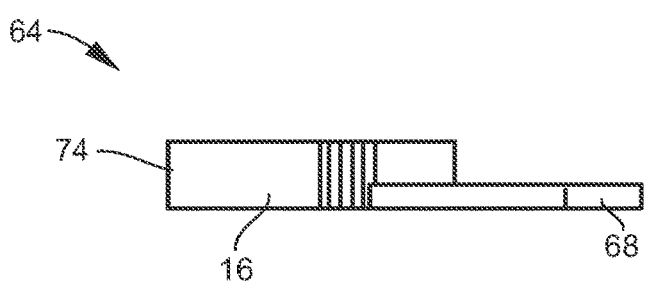
FIG. 4C illustrates a side view of the top tab plate device of FIG. 4A
Figure 4D:
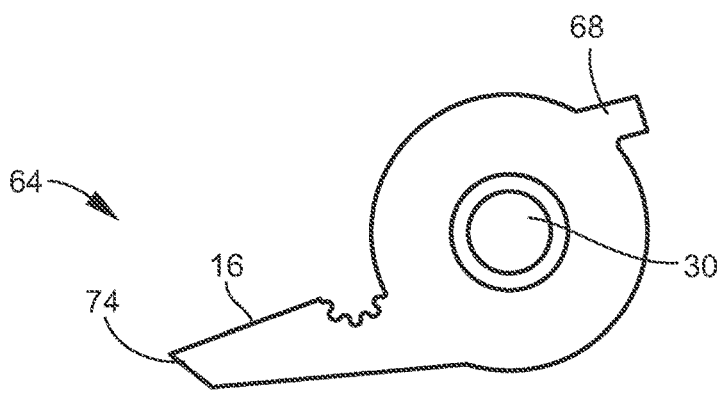
FIG. 4D illustrates a bottom view of the top tab plate device of FIG. 4A
Figure 6A:
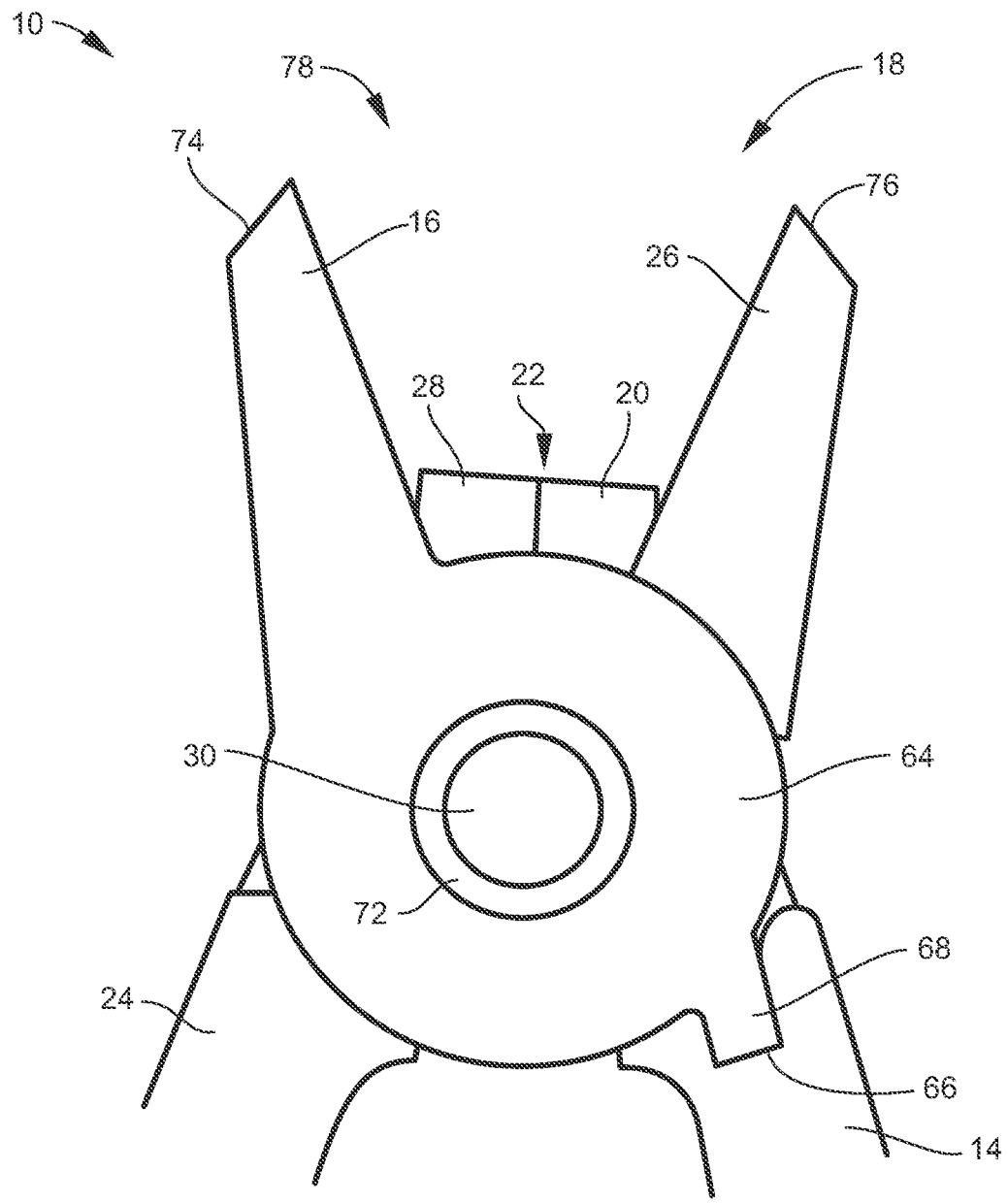
FIG. 6A illustrates a front view of the operating portion of the pliers for cleaning a nozzle of a welding gun according to select embodiments of the instant disclosure in the open position.
Figure 6B:
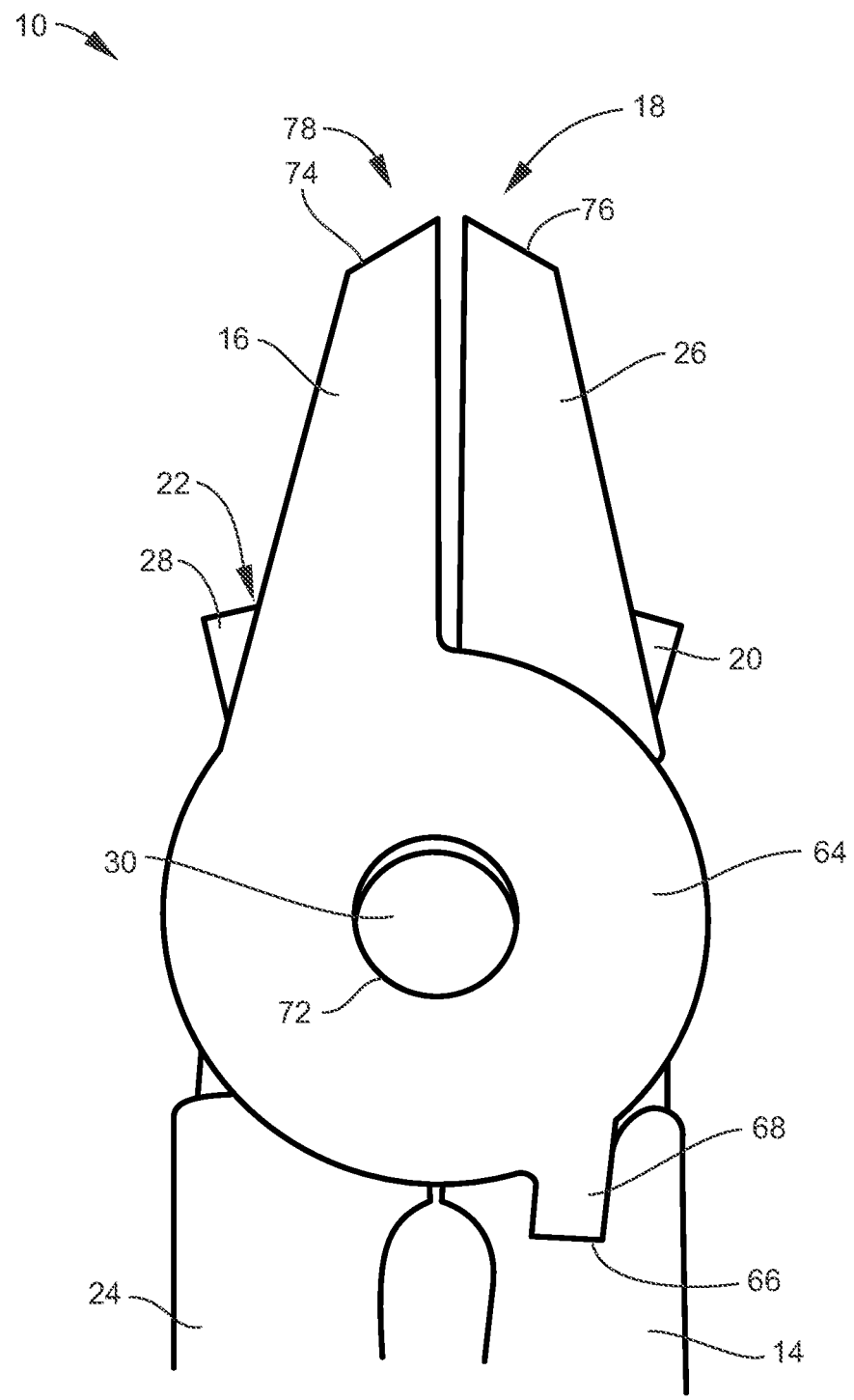
FIG. 6B illustrates a front view of the operating portion of the pliers for cleaning a nozzle of a welding gun of FIG. 6A in the closed position.
Figure 6C:
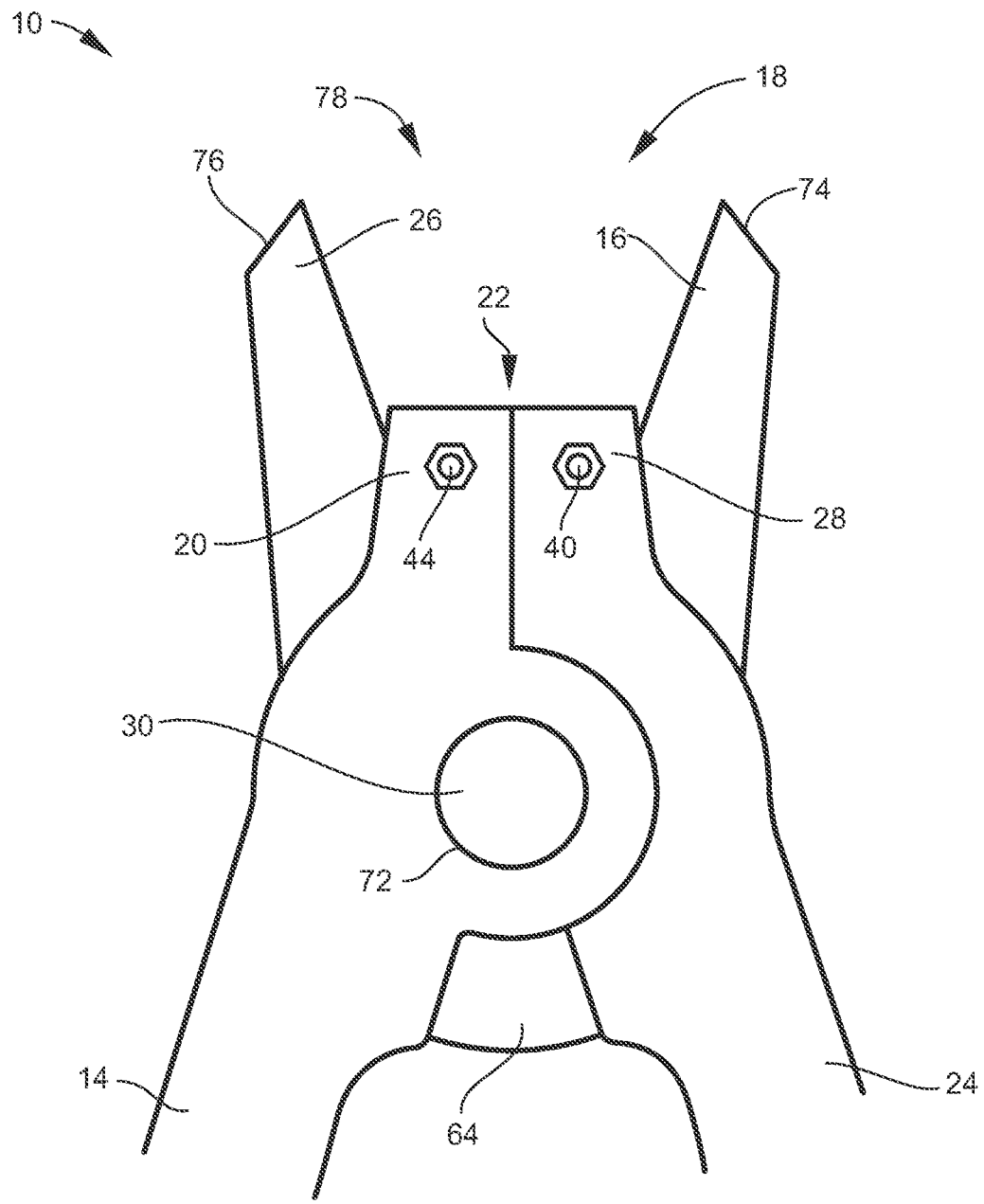
FIG. 6C illustrates a rear view of the operating portion of the pliers for cleaning a nozzle of a welding gun of FIG. 6A in the open position.
Figure 6D:
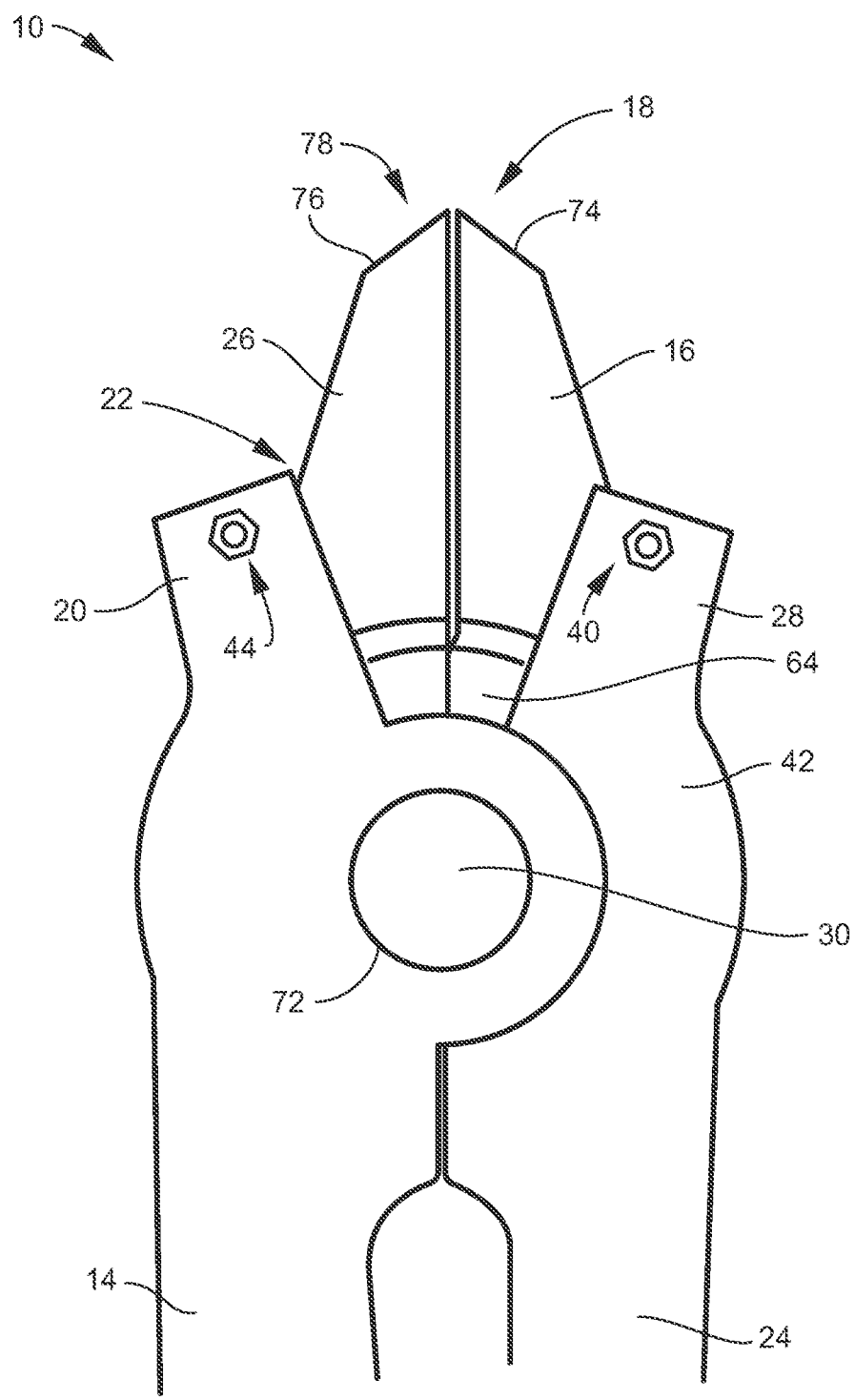
FIG. 6D illustrates a rear view of the operating portion of the pliers for cleaning a nozzle of a welding gun of FIG. 6A in the closed position.
Figure 6E:
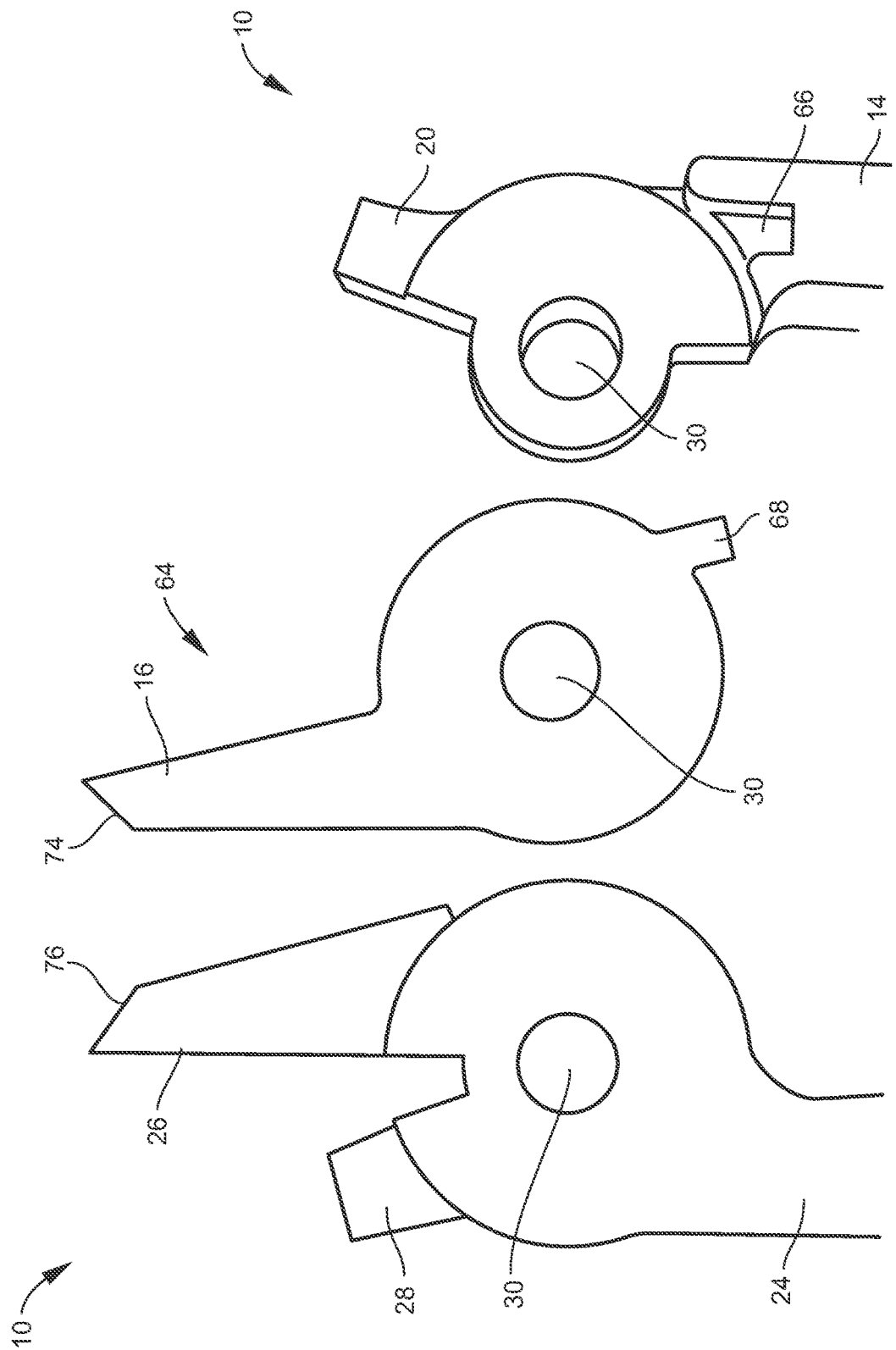
FIG. 6E illustrates a partially disassembled view of the operating portion of the pliers for cleaning a nozzle of a welding gun of FIG. 6A in the closed position.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-10, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-9, in a possibly preferred embodiment, the present disclosure overcomes the above-mentioned disadvantages and meets the recognized need for such an apparatus or method by providing of pliers 10 for cleaning of welding gun nozzle 12. Welding gun nozzle 12 cleaned and handled by pliers 10 may be any size, shape or type of nozzle for a welding gun, including, but not limited to, straight, bottleneck and short or long taper nozzles for gas metal arc welding (GMAW), sometimes referred to by its subtypes metal inert gas (MIG) welding or metal active gas (MAG) welding. As such, pliers 10 may be designed for cleaning various sizes and shapes of welding nozzles.

Pliers 10 may generally include right handle 14 and left handle 24. Right handle 14 may be configured to operate top left gripping end 16 of top pliers portion 18. In addition, while operating top left gripping end 16, right handle 14 may also be configured to simultaneously operate bottom right nozzle cleaner 20 of bottom nozzle cleaner mechanism 22. For its counterpart, left handle 24 may be configured to operate top right gripping end 26 of top pliers portion 18. In addition, while operating top right gripping end 26, left handle 24 may also be configured to simultaneously operate bottom left nozzle cleaner 28 of bottom nozzle cleaner mechanism 22. Right handle 14 and left handle 24 may be hingedly fixed together about connection point 30. As a result, when left handle 24 and right handle 14 are closed together (see FIGS. 6B, 6D, 7 and 8), top left gripping end 16 and top right gripping end 26 may be configured to squeeze together as top pliers portion 18. In addition, bottom right nozzle cleaner 20 and bottom left nozzle cleaner 28 may be configured to simultaneously spread apart as bottom nozzle cleaner mechanism 22. And in the converse operation, when left handle 24 and right handle 14 are opened from one another (see FIGS. 6A, 6C, and 9), top left gripping end 16 and top right gripping end 26 may be configured to spread apart as top pliers portion 18. In addition, bottom right nozzle cleaner 20 and bottom left nozzle cleaner 28 may be configured to come together as bottom nozzle cleaner mechanism 22.

Figure 7:
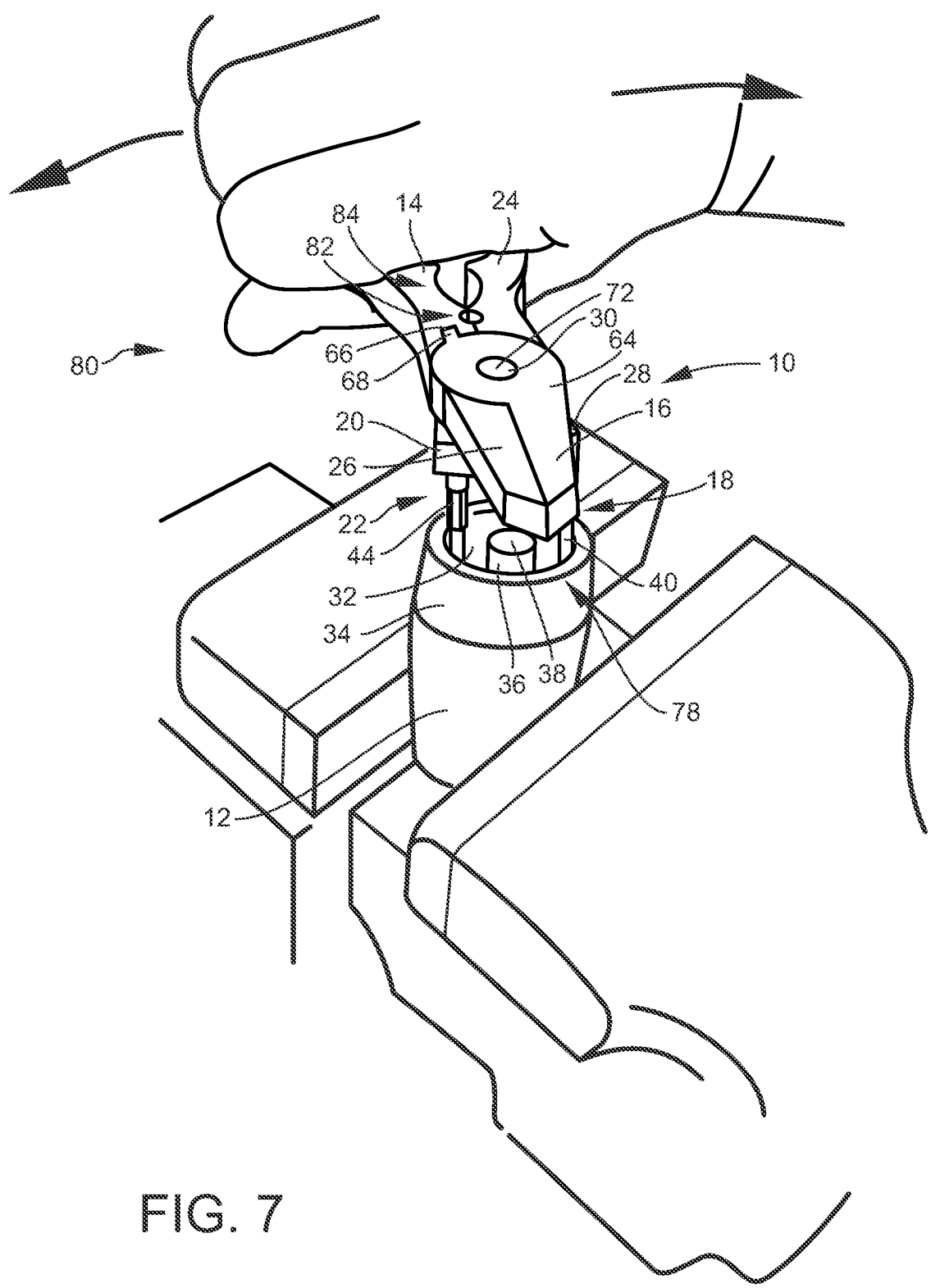
FIG. 7 illustrates an environmental view of the pliers for cleaning a nozzle of a welding gun shown in the closed position cleaning the inside wall of the outer casing of the nozzle of a welding gun with the threaded pins.
Figure 8:
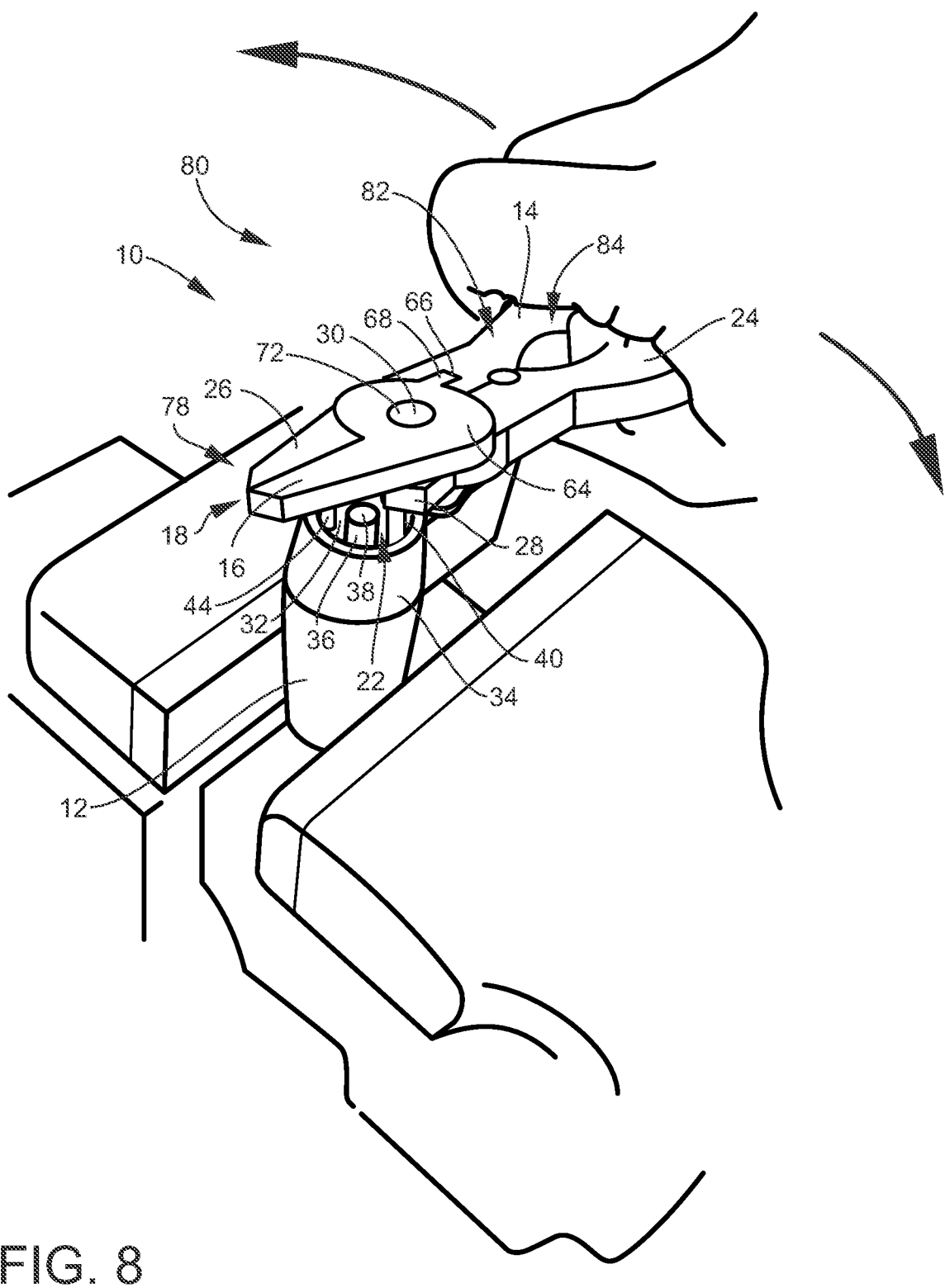
FIG. 8 illustrates another environmental view of the pliers for cleaning a nozzle of a welding gun shown in the closed position cleaning the inside wall of the outer casing of the nozzle of a welding gun with the threaded pins.
Figure 9:
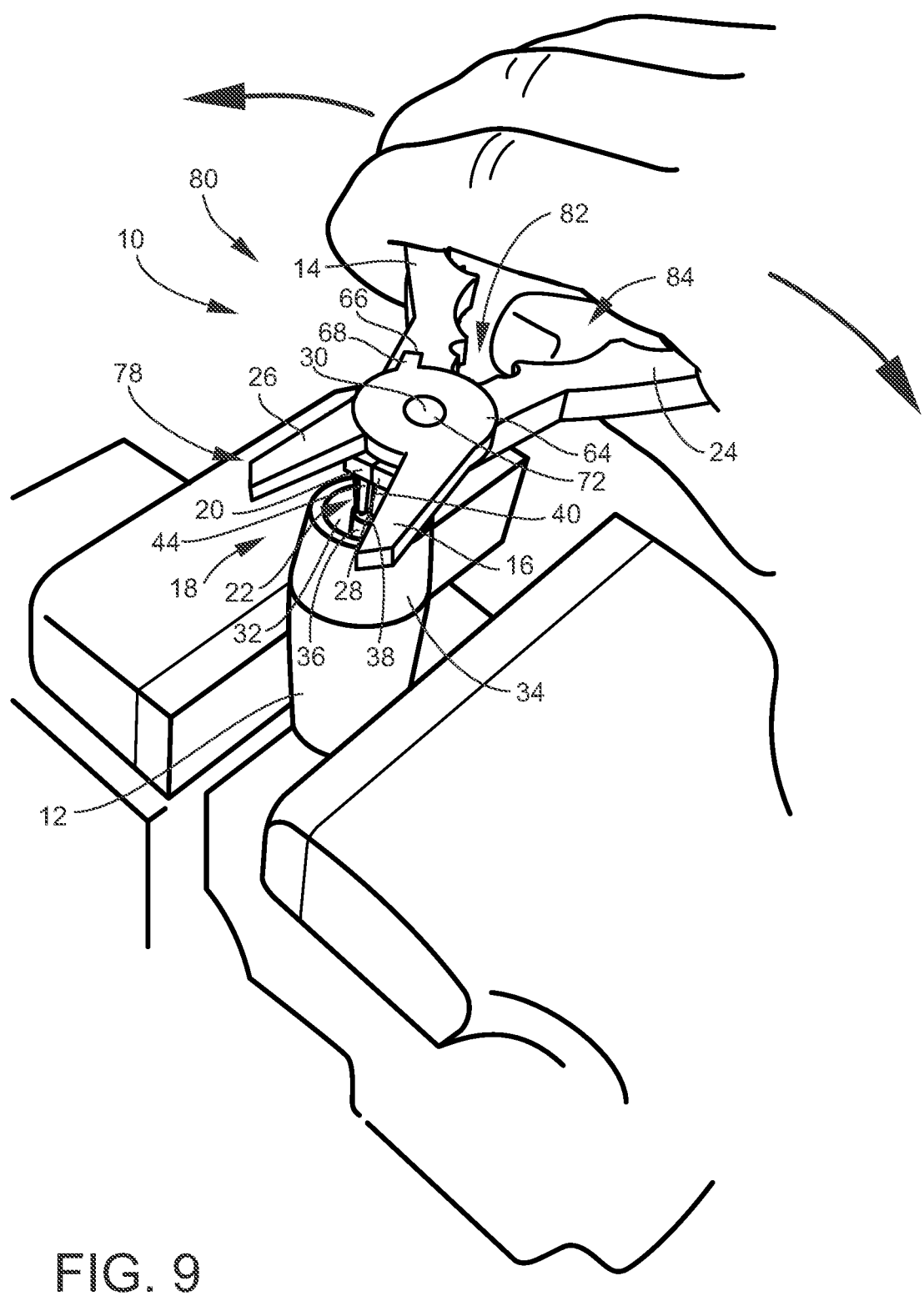
FIG. 9 illustrates an environmental view of the pliers for cleaning a nozzle of a welding gun shown in the open position cleaning the outside of the tip of the nozzle of a welding gun with the threaded pins.

Referring specifically to FIGS. 7-9, one feature of pliers 10 may be that they can be configured for cleaning welding gun nozzle 12. Pliers 10 may be configured to clean welding gun nozzle 12 via bottom nozzle cleaner mechanism 22 with bottom right nozzle cleaner 20 and bottom left nozzle cleaner 28. In select embodiments, as shown in FIGS. 7 and 8, when left handle 24 and right handle 14 are closed together, bottom right nozzle cleaner 20 and bottom left nozzle cleaner 28 may be configured to spread apart, which can be used for, but is clearly not limited to, cleaning inside wall 32 of outer casing 34 of welding gun nozzle 12. As shown in FIGS. 7 and 8, when handles 14 and 24 are closed together and the pair of nozzle cleaners 20 and 28 are forced to spread apart, this force can be used to clean inside wall 32 of outer casing 34 of welding gun nozzle 12 by applying this spreading force and rotating pliers 10 back and forth for removing any build up or splatter on inside wall 32 of outer casing 34. This process can provide a quick and easy means for cleaning inside wall 32 of outer casing 34 with pliers 10, which can be done with nozzle 12 positioned between vice grips (as shown in the figures), with nozzle 12 on or off of the associated welding gun. In other select embodiments, as shown in FIG. 9, when left handle 24 and right handle 14 are opened from one another, bottom right nozzle cleaner 20 and bottom left nozzle cleaner 28 are configured to come together, which can be used for, but is clearly not limited to, cleaning outside 36 of tip 38 of welding gun nozzle 12. As shown in FIG. 9, when handles 14 and 24 are opened and the pair of nozzle cleaners 20 and 28 are forced to come together, this force can be used to clean outside 36 of tip 38 of welding gun nozzle 12 by applying this compression force and rotating pliers 10 back and forth for removing any build up or splatter on outside 36 of tip 38. This process may provide a quick and easy means for cleaning outside 36 of tip 38 with pliers 10, which can be done with nozzle 12 positioned between vice grips (as shown in the figures), with nozzle 12 on or off of the associated welding gun.

Referring now to FIGS. 1-5, another feature of pliers 10 for cleaning welding gun nozzle 12 may be that bottom left nozzle cleaner 28 may include left pin 40 and bottom right nozzle cleaner 20 may include right pin 44. Left pin 40 and right pin 44 may be oriented perpendicular from bottom surface 42 of pliers 10. Left pin 40 and right pin 44 may be attached or oriented perpendicular on bottom surface 42 of pliers 10 by any means, including being removably attached or permanently fixed perpendicular on bottom surface 42 of pliers 10. As shown in the FIGS, in select embodiments, left pin 40 may include first threaded portion 46 for removably attaching left pin 40 to first threaded hole 48 in bottom left nozzle cleaner 28. Likewise, in select embodiments, right pin 44 may include second threaded portion 50 for removably attaching right pin 44 to second threaded hole 52 in bottom right nozzle cleaner 20. These removable embodiments of left pin 40 and right pin 44 of bottom nozzle cleaner mechanism 22 may allow for changing out of left pin 40 and/or right pin 44 for providing removing and replacing of the pins or for providing rotation between various size and shapes of left pin 40 and right pin 44 of bottom nozzle cleaner mechanism 22. In select embodiments, first threaded portion 46 of left pin 40 and second threaded portion 50 of right pin 44 may be left-handed threads 54. Left-handed threads 54 of the pins may be configured to be inserted into first threaded hole 48 and second threaded hole 52, respectively, via counter clockwise rotation. As such, left-handed threads 53 may be configured to prevent backing out of left pin 40 and right pin 44 during operation of bottom nozzle cleaner mechanism 22. In other select embodiments, left pin 40 may include hexagonal-shaped bottom left portion 56 configured for being gripped (like by a wrench) for inserting and removing left pin 40. Likewise, in select embodiments, right pin 44 may include hexagonal-shaped bottom right portion 58 configured for being gripped (like by a wrench) for inserting and removing right pin 44.

Another feature of pliers 10 for cleaning welding gun nozzle 12 may be that left pin 40 may include cylindrical top left portion 60 with length 61 or size configured for cleaning welding gun nozzle 12. Likewise, right pin 44 may include cylindrical top right portion 62 with a corresponding length 61 or size configured for cleaning welding gun nozzle 12. Length 61 or the size of left pin 40 and right pin 44 may be set based on the selected nozzle 12 and may vary for various nozzles 12. As such, by providing removable pins 40 and 44 of bottom nozzle cleaner mechanism 22, various lengths 61 or sizes of the pins 40 and 44 may be used on pliers 10 as desired.

Referring now specifically to FIGS. 1-6, in select embodiments of pliers 10 for cleaning welding gun nozzle 12, pliers 10 may include top tab plate 64 (shown specifically in FIGS. 4A, 4B, 4C and 4D). Top tab plate 64 may be for connecting together right handle 14 and left handle 24 and for allowing the simultaneous operation of top pliers portion 18 and bottom nozzle cleaner mechanism 22 via left handle 24 and right handle 14. As should be clear to one skilled in the art, top tab plate 64 may be on either the top or the bottom of right handle 14 and/or left handle 24. In addition, left handle 24 may switch sides with right handle 14. As shown best in the operation portion of pliers 10 shown in FIGS. 6A, 6B, 6C, 6D and 6E, top tab plate 64 may be positioned over left handle 24 and right handle 14 at connection point 30. Top tab plate 64 may be configured to join together left handle 24 and right handle 14. Top tab plate 64 may include top left gripping end 16. To operate top left gripping end 16, right handle 14 may include notch 66 cut out for receiving protrusion 68 from top tab plate 64. Wherein, when right handle 14 is rotated about connection point 30, top tab plate 64 may rotate top left gripping end 16. As such, in select embodiments, left handle 24 with top right gripping end 26 may be comprised of one solid piece 70. In other select embodiments, steel pin 72 may be positioned through top tab plate 64, right handle 14 and left handle 24 at connection point 30. Wherein, steel pin 72 may be configured to attach left handle 24, right handle 14 and top tab plate 64 about connection point 30 for operation of pliers 10.

Pliers 10 may be configures as any style, size or shape of pliers desired by the welder or user, including but not limited to, any style, size or shape of top pliers portion 18. In select embodiments of pliers 10 for cleaning welding gun nozzle 12, as shown in the Figures, top left gripping end 16 may be left needle nose pliers end 74. Likewise, top right gripping end 26 may be right needle nose pliers end 76. Wherein, top left gripping end 16 and top right gripping end 26 may be operable as needle nose pliers 78 via left handle 24 and right handle 14.

As shown throughout the Figures, pliers 10 for cleaning welding gun nozzle 12 may be configured as multi-function pliers 80 for welders. These multi-functional pliers 80 may be configured to have the convenience of needle nose pliers 78 (or other pliers) via top left gripping end 16 and top right gripping end 26, and wire snipper 82 via left handle 24 and right handle 14, while adding the ability to clean welding gun nozzle 12 without damaging it via bottom right nozzle cleaner 20 and bottom left nozzle cleaner 28. In addition, pliers 10 may include nozzle remover 84 configured for removing welding gun nozzle 12 and tip 38 from the associated welding gun. As such, in select embodiments of pliers 10 for cleaning welding gun nozzle 12, wire snipper 82 may be between left handle 24 and right handle 14. Wherein, left handle 24 and right handle 14 may include corresponding indentions 86 configured for cutting wire between left handle 24 and right handle 14. In select other embodiments of pliers 10 for cleaning welding gun nozzle 12, nozzle remover 84 may be included as opening portion 88 configured for gripping welding gun nozzle 12 between left handle 24 and right handle 14. Wherein, left handle 24 and right handle 14 may include corresponding concave sections 90 configured for removal and installation of welding gun nozzle 12

Sill referring to FIGS. 1-9, in another aspect, the instant disclosure embraces pliers 10 for cleaning welding gun nozzle 12 that can include pair of bottom nozzle cleaners (20 and 28) extending perpendicular from pliers 10. Pair of bottom nozzle cleaners (20 and 28) may be configured to spread apart when pliers 10 are closed. Pair of bottom nozzle cleaners (20 and 28) may also be configured to come together when pliers 10 are opened. Wherein, pair of bottom nozzle cleaners (20 and 28) may be operable as nozzle cleaner mechanism 22 configured for cleaning welding gun nozzle 12, like as shown in FIGS. 7-9 and described above.

In select embodiments of these pliers 10 for cleaning welding gun nozzle 12, a pair of top gripping ends (16 and 26) may be on the top of the pair of bottom nozzle cleaners (20 and 28). Pair of top gripping ends (16 and 26) may be configured to squeeze together when pliers 10 are closed. Pair of top gripping ends (16 and 26) may be configured to spread apart when pliers 10 are opened. Wherein, pair of top gripping ends (16 and 26) are operable as pliers portion 18.

In select embodiments of these pliers 10 for cleaning welding gun nozzle 12, the pair of top gripping ends (16 and 26) may be a pair of needle nose pliers ends (74 and 76). Wherein, the pair of top gripping ends (16 and 26) may be operable as needle nose pliers 78.

Figure 10:
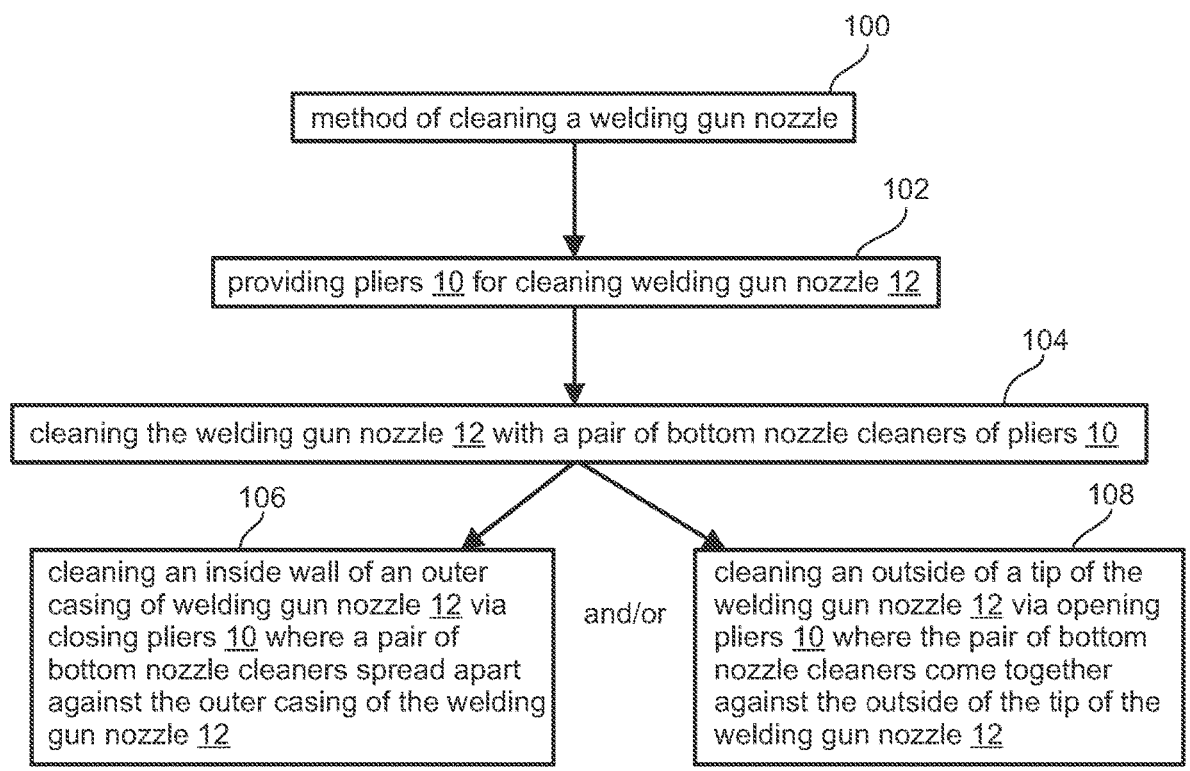
FIG. 10 illustrates a flow chart of the method of cleaning a welding gun nozzle according to select embodiments of the instant disclosure.

Referring now to FIG. 10, in another aspect, the instant disclosure embraces method 100 of cleaning welding gun nozzle 12. Method 100 of cleaning welding gun nozzle 12 may include using the disclosed pliers 10 for cleaning welding gun nozzle 12 in any of the various embodiments shown and/or described herein. As such, method 100 of cleaning welding gun nozzle 12 may generally include the steps of: step 102 of providing pliers 10 for cleaning welding gun nozzle 12 in any of the various embodiments shown and/or described herein; and step 104 of cleaning welding gun nozzle 12 with pair of bottom nozzle cleaners (20 and 28) of the provided pliers 10. In select embodiments of method 100 of cleaning welding gun nozzle 12, step 104 of cleaning welding gun nozzle 12 with said pair of bottom nozzle cleaners (20 and 28) of the provided pliers 10 may include: step 106 of cleaning inside wall 32 of outer casing 34 of welding gun nozzle 12 via closing pliers 10 where said pair of bottom nozzle cleaners (20 and 28) spread apart against outer casing 34 of welding gun nozzle 12; and/or step 108 of cleaning outside 36 of tip 38 of welding gun nozzle 12 via opening pliers 1—where said pair of bottom nozzle cleaners (20 and 28) come together against outside 36 of tip 38 of welding gun nozzle 12.

In sum, pliers 10 may be multi-function pliers 80 for welders. Pliers 10 may allow the welders to have the convenience of your typical needle nose pliers and wire snippers while adding the ability to clean their nozzle without damaging and removing the nozzle and tip from their welding gun. Pliers 10 may generally be comprised of three pieces. Top tab plate 64, right handle 14, and left handle 24. Right handle 14 may have notch 66 cut out for protrusion 68 of top tab plate 64 which is used to connect left handle 24 and right handle 14.

A feature of the present disclosure of pliers 10 may be its ability to clean nozzle 12 without damaging/scraping tip 38 or having to remove nozzle 12 from the associated welding gun to avoid such damages.

Another feature of the present disclosure of pliers 10 may be its left-handed threads 54, screw-in nozzle cleaner attachments or pins 40 and 44. These attachment pins 40 and 44 may screw into bottom surface 42 of left handle 24 and right handle 14 of pliers 10 and can be adjusted to fit the size of the nozzle 12 being used. The attachments pins 40 and 44 also can be replaced themselves as to having to replace the entire set of pliers 10.

Another advantage to the present disclosure of pliers 10 may be the way that the bottom nozzle cleaner mechanism 22 opens opposite the actual top pliers portion 18 insuring a strong grip while cleaning nozzle 12.

Another feature of the present disclosure of pliers 10 may be its ability to remove the entire nozzle 12 as well as replace the nozzle 12 on the welding gun with nozzle remover 84.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. Pliers for cleaning a welding gun nozzle comprising:
a right handle including a bottom right nozzle cleaner of a bottom nozzle cleaner mechanism, a notch cut out, and a right handle aperture;
a left handle including a top right gripping end of a top pliers portion, a bottom left nozzle cleaner of the bottom nozzle cleaner mechanism, and a left handle aperture;
a top tab plate including a top left gripping end of the top pliers portion, a protrusion, and a top tab plate aperture;

the right handle aperture of the right handle, the left handle aperture of the left handle, and the top tab plate aperture of the top tab plate are connected together via a pivot;

the notch cut out of the right handle receives the protrusion from the top tab plate, wherein, when the right handle is rotated about the pivot, the top left gripping end is rotated;

the right handle and the left handle are hingedly fixed together about the pivot, wherein:

when the left handle and the right handle are closed together, the top left gripping end and the top right gripping end are configured to squeeze together as the top pliers portion and the bottom right nozzle cleaner and the bottom left nozzle cleaner are configured to spread apart; and when the left handle and the right handle are opened from one another, the top left gripping end and the top right gripping end are configured to spread apart as the top pliers portion and the bottom right nozzle cleaner and the bottom left nozzle cleaner are configured to come together.

2. The pliers for cleaning the welding gun nozzle of claim 1, wherein the pliers are configured for cleaning the welding gun nozzle via the bottom nozzle cleaner mechanism with the bottom right nozzle cleaner and the bottom left nozzle cleaner.

3. The pliers for cleaning the welding gun nozzle of claim 2, wherein:

when the left handle and the right handle are closed together, the bottom right nozzle cleaner and the bottom left nozzle cleaner are configured to spread apart for cleaning an inside wall of an outer casing of the welding gun nozzle; and when the left handle and the right handle are opened from one another, the bottom right nozzle cleaner and the bottom left nozzle cleaner are configured to come together for cleaning an outside of a tip of the welding gun nozzle.

4. The pliers for cleaning the welding gun nozzle of claim 1, wherein:

the bottom left nozzle cleaner includes a left pin oriented perpendicular from a bottom surface of the pliers; and the bottom right nozzle cleaner includes a right pin oriented perpendicular from the bottom surface of the pliers.

5. The pliers for cleaning the welding gun nozzle of claim 4, wherein:

the left pin includes a first threaded portion for removably attaching the left pin to a first threaded hole in the bottom left nozzle cleaner; and the right pin includes a second threaded portion for removably attaching the right pin to a second threaded hole in the bottom right nozzle cleaner.

6. The pliers for cleaning the welding gun nozzle of claim 5, wherein the first threaded portion of the left pin and the second threaded portion of the right pin are left-handed threads configured to be inserted into the first threaded hole and the second threaded hole, respectively, via counter clockwise rotation to prevent backing out of the left pin and the right pin during a use of the bottom nozzle cleaning mechanism.

7. The pliers for cleaning the welding gun nozzle of claim 5, wherein:

the left pin includes a hexagonal-shaped bottom left portion configured for being gripped for inserting and removing the left pin; and the right pin includes a hexagonal-shaped bottom right portion configured for being gripped for inserting and removing the right pin.

8. The pliers for cleaning the welding gun nozzle of claim 4, wherein:

the left pin includes a cylindrical top left portion with a length configured for cleaning the welding gun nozzle; and the right pin includes a cylindrical top right portion with the length configured for cleaning the welding gun nozzle.

9. The pliers for cleaning the welding gun nozzle of claim 1, wherein the pivot is a steel pin through the top tab plate aperture, the right handle aperture and the left handle aperture.

10. The pliers for cleaning the welding gun nozzle of claim 1, wherein:

the top left gripping end is a left needle nose pliers end; and the top right gripping end is a right needle nose pliers end;

wherein, the top left gripping end and the top right gripping end are operable as needle nose pliers via the left handle and the right handle.

11. The pliers for cleaning the welding gun nozzle of claim 1, the pliers are configured as multi-function pliers for welders, where the pliers comprise:

needle nose pliers via the top left gripping end and the top right gripping end, a wire snipper via the left handle and the right handle, a welding gun nozzle cleaner via the bottom right nozzle cleaner and the bottom left nozzle cleaner configured to clean the welding gun nozzle without damaging it, and a nozzle remover configured for removing the welding gun nozzle and the tip from a welding gun.

12. The pliers for cleaning the welding gun nozzle of claim 11, wherein the wire snipper is between the left handle and the right handle, wherein the left handle and the right handle include corresponding indentions configured for cutting wire between the left handle and the right handle.

13. The pliers for cleaning the welding gun nozzle of claim 11, wherein the nozzle remover is an opening portion configured for gripping the welding gun nozzle between the left handle and the right handle, wherein the left handle and the right handle include corresponding concave sections configured for nozzle removal and installation.

14. Pliers for cleaning a welding gun nozzle comprising:

a right handle and a left handle pivotably connected at a pivot, a pair of bottom nozzle cleaners extending perpendicular from a bottom surface of the pliers;

said pair of bottom nozzle cleaners are configured to spread apart when the pliers are closed;

said pair of bottom nozzle cleaners are configured to come together when the pliers are opened;

wherein said pair of bottom nozzle cleaners are operable as a nozzle cleaner mechanism configured for cleaning the welding gun nozzle, wherein, the bottom nozzle cleaners include a left pin oriented perpendicular from the bottom surface of the pliers, and a right pin oriented perpendicular from the bottom surface of the pliers;

wherein:

the left pin includes a first threaded portion for removably attaching the left pin to a first threaded hole in the bottom nozzle cleaners; and the right pin includes a second threaded portion for removably attaching the right pin to a second threaded hole in the bottom nozzle cleaner;

wherein the first threaded portion of the left pin and the second threaded portion of the right pin are left-handed threads configured to be inserted into the first threaded hole and the second threaded hole, respectively, via counter clockwise rotation to prevent backing out of the left pin and the right pin during a use of the bottom nozzle cleaning mechanism.

15. The pliers for cleaning the welding gun nozzle of claim 14, further comprising:

a pair of top gripping ends on a top of the pair of bottom nozzle cleaners;

said pair of top gripping ends are configured to squeeze together when the pliers are closed;

said pair of top gripping ends are configured to spread apart when the pliers are opened;

wherein, said pair of top gripping ends are operable as a pliers portion.

16. The pliers for cleaning a welding gun nozzle of claim 15, wherein the pair of top gripping ends are a pair of needle nose pliers ends.

17. Pliers for cleaning a welding gun nozzle comprising:

a right handle and a left handle pivotably connected at a pivot, a pair of bottom nozzle cleaners extending perpendicular from a bottom surface of the pliers;

said pair of bottom nozzle cleaners are configured to spread apart when the pliers are closed;

said pair of bottom nozzle cleaners are configured to come together when the pliers are opened;

wherein said pair of bottom nozzle cleaners are operable as a nozzle cleaner mechanism configured for cleaning the welding gun nozzle;

wherein, the bottom nozzle cleaners include a left pin oriented perpendicular from the bottom surface of the pliers, and a right pin oriented perpendicular from the bottom surface of the pliers;

wherein:

the left pin includes a first threaded portion for removably attaching the left pin to a first threaded hole in the bottom nozzle cleaners; and the right pin includes a second threaded portion for removably attaching the right pin to a second threaded hole in the bottom nozzle cleaner;

wherein:

the left pin includes a hexagonal-shaped bottom left portion configured for being gripped for inserting and removing the left pin; and the right pin includes a hexagonal-shaped bottom right portion configured for being gripped for inserting and removing the right pin.

\* \* \* \* \*